Feb. 6, 1934.  H. D. GEYER  1,945,605

FREEZING TRAY

Filed May 2, 1931

Inventor

Harvey D. Geyer

By Spencer, Hardman & Fehr

His Attorneys

Patented Feb. 6, 1934

1,945,605

UNITED STATES PATENT OFFICE 1,945,605

FREEZING TRAY

Harvey D. Geyer, Dayton, Ohio, assignor to The Inland Manufacturing Company, Dayton, Ohio, a corporation of Delaware Application May 2, 1931. Serial No. 534,472

15 Claims. (Cl. 62—108.5)

This invention relates to ice freezing trays, and more particularly to trays that are to be inserted within a freezing compartment of a domestic refrigerator.

An object of the present invention is to provide a tray that is economically made of flexible non-metallic material that is efficient in freezing contents and which may be easily flexed to facilitate the removal of the frozen contents.

Another object is to provide a freezing tray that is molded separately of soft rubber, and then supported by rods on the bottom that are connected to the end walls for supporting said tray in proper relative position.

Another object is the economy of manufacture due to the flexible rubber tray being molded separately without metal inserts or a supporting frame. The supporting means may be economically made from metal wire adapted to engage and retain in proper position the thin flexible rubber tray and facilitates its handling.

Another object is the rapid freezing and also easy ejection of the frozen contents due to the very thin flexible walls which are permitted by the use of rod supports adjacent the bottom and connected to the end walls.

Further objects and advantages of the present invention will be apparent from the following description, reference being had to the accompanying drawing wherein a preferred embodiment of one form of the present invention is clearly shown.

Figure 5:
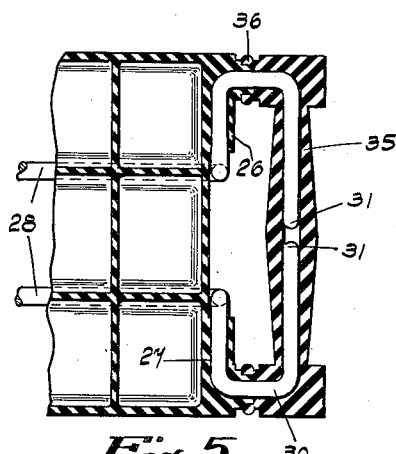
Fig. 5 is a fragmentary sectional view taken on the line 5—5 of Fig. 3.
Figure 4:
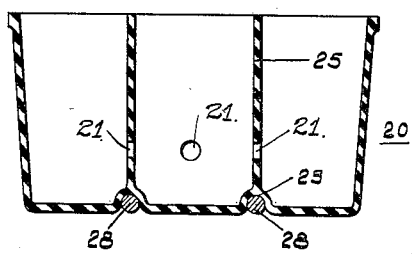
Fig. 4 is a transverse section on the line 4—4 of Fig. 1.

Referring to the drawing, a flexible rubber tray 20 is molded from a high grade of flexible rubber, or other similar material to which ice will not readily adhere, and hence the frozen contents may be easily removed. The tray is provided with longitudinal and transverse partitions, which are molded integrally with walls of the tray and are preferably formed with apertures 21 near the bottom of the tray to level the liquid contents when the tray is being filled, assuring uniform cubes. The tray 20 is molded with two longitudinally extending grooves 23 on the bottom of the flexible tray so that they will be substantially beneath the longitudinal partitions 25. Molded integrally on each end wall of the tray are a pair of L-shaped lugs or projections 26 each having a hole 27 therethrough, as shown in Fig. 5.

Figure 1:
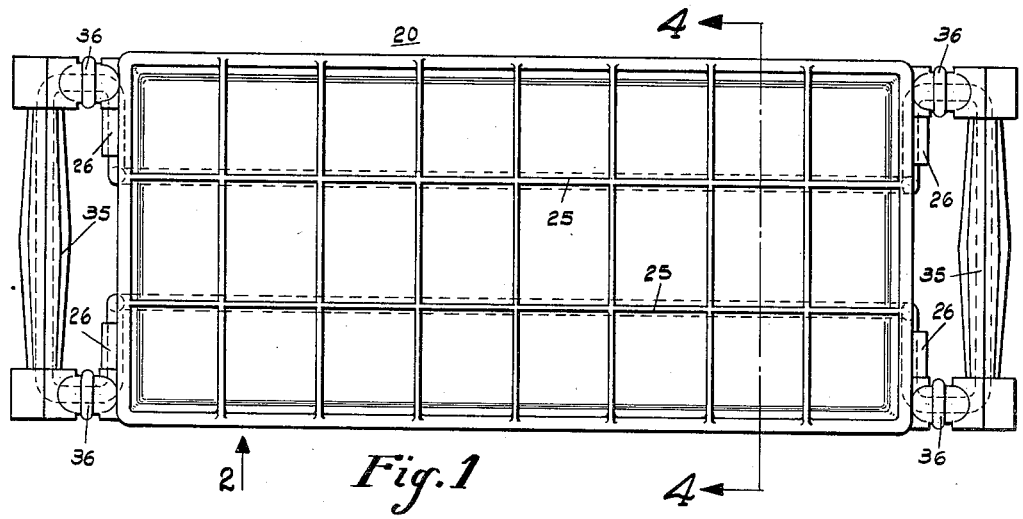
Fig. 1 is a plan view of a flexible rubber freezing tray which is adapted to be inserted within the freezing compartment of a domestic refrigerator.
Figure 2:
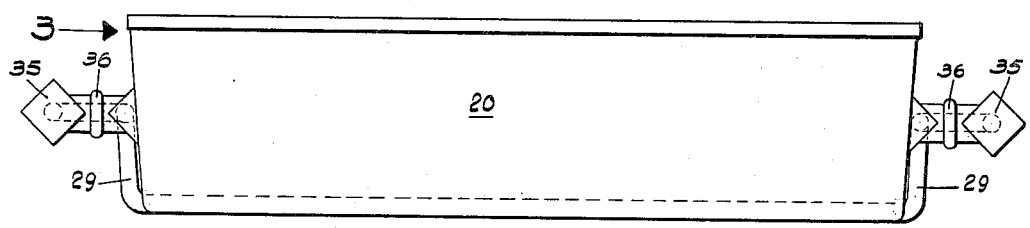
Fig. 2 is a side view looking in the direction of arrow 2 in Fig. 1.
Figure 3:
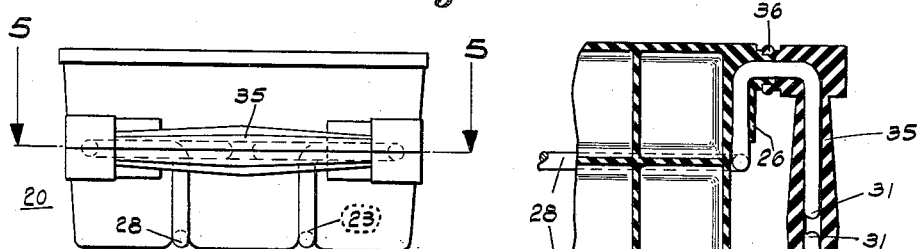
Fig. 3 is an end view looking in the direction of arrow 3 of Fig. 2.

A pair of metal supports 28 preferably made from steel wire of suitable size are adapted to fit in the grooves 23 to support the tray. By this means the tray is held in place and supported against undue deflection when said tray is filled with contents to be frozen. The two ends of each wire are bent upward at an angle, as at 29, to receive snugly the end walls of the tray. The ends of the wire bars are still further bent or deformed to form a U-shaped portion 30 parallel to the plane of the longitudinal wire bars 28 forming a T, as viewed in Fig. 3, so that corresponding rounded ends 31 of the bars extend toward each other. The bars 28 not only support the tray but also act as a good conductor in assisting the transfer of heat.

A hollow U-shaped handle 35 is molded separately from rubber or other suitable material adapted to receive the ends 31 and engage a portion of the lugs 26 adding to the general appearance and facilitates the handling of the tray.

In assembling the bars to the tray so as to connect the bars to the end walls thereof, the ends of the bars are moistened with water or any suitable liquid so that the portions will pass easily through the hole 27, and the hollow handle 35.

The handle 35 is assembled to the container, after the supports or bars 28 are connected thereto, by flexing the container so that the ends 31 of the bars 28 are out of alignment with each other to permit each apertured end 36 of the handle 35 to be placed over the ends 31, and then the container, due to the flexibility of the rubber, is allowed to snap back to the normal position, thus forming a neat grip or handle of utility.

Since the bars are attached to the end walls of the tray and the bottom of the tray rests upon the bars 28, it is obvious that the bottom of the tray may be easily flexed upwardly away from the bars with the fingers to loosen and remove the frozen ice cubes from the container by arching the tray. Or if only one or two cubes are needed, these may be easily pressed upwardly from the tray by pressing with the fingers from below.

While the form of embodiment of the present invention as herein disclosed, constitutes a preferred form, it is to be understood that other forms might be adopted, all coming within the scope of the claims which follow.

What is claimed is as follows:—

1. A flexible rubber freezing container having; a pair of L-shaped lugs formed integral with one end wall of the container, said lugs having holes therein; a pair of bars extending longitudinally along the bottom of said container and having ends extending through the lugs; and a member engaging the ends of the bars to form a handle structure at each end thereof.

2. A freezing container of flexible material having a plurality of longitudinal grooves on the bottom thereof; a plurality of apertured projections formed integral with the end walls thereof; metal bars adapted to engage the grooves, said bars having ends bent upwardly and then into U-shaped form, said ends extending toward each other; and a separate flexible member fixed to said ends to form a handle.

3. A freezing tray comprising; a container having longitudinal and transverse partitions; supporting members underlying said longitudinal partitions of the container, said members having transverse U-shaped ends extending substantially in a plane parallel to the bottom of said container and connected to the end walls thereof and forming a handle for the container.

4. A freezing tray comprising; a container having longitudinal and transverse partitions, said container having longitudinal grooves on the bottom underlying the longitudinal partitions; supporting members having intermediate portions engaging said grooves and U-shaped transverse ends lying above the plane of said intermediate portions and attached to the end walls of the container; and a flexible member engaging the U-shaped ends and forming a handle for the container.

5. A freezing tray comprising: a flexible non-metallic container and a relatively rigid metal support therefor, said metal support having upwardly extending end portions so secured to said flexible container at the end walls thereof as to prevent separation when the container is flexed for removal of its frozen contents, and said support having a portion underlying and supporting the bottom of said container but freely separable therefrom to permit the bottom of said container to be flexed upwardly to facilitate removal of its frozen contents.

6. A freezing tray comprising: a flexible non-metallic container and a relatively rigid metal support therefor, said metal support having end portions secured to the ends of said flexible container substantially intermediate the top and bottom edges thereof and having an intermediate portion underlying and supporting the bottom of said container but freely separable therefrom to permit easy upward flexing of the bottom of said container whereby to facilitate the removal of its frozen contents.

7. A freezing tray comprising: a flexible non-metallic container and a relatively rigid metal support therefor, said metal support having upturned end portions fixed to each of the end walls of said container substantially intermediate the top and bottom edges thereof and having an intermediate portion underlying and supporting said container bottom but freely separable therefrom, whereby to permit easy flexing of said container to remove its frozen contents.

8. A freezing tray comprising: a flexible non-metallic container and a relatively rigid metal support therefor, said metal support comprising a relatively long narrow metal strip underlying and supporting the container bottom but freely separable therefrom, said strip having end portions secured only to the ends of said container and so forming a unitary construction.

9. A freezing tray comprising: a flexible non-metallic container and a relatively rigid metal support therefor, said metal support comprising two individual long narrow metal strips spaced apart and underlying and supporting the container bottom but freely separable therefrom, said strips each having end portions individually secured to the ends of said container and forming a unitary construction of the tray and metal support.

10. A freezing tray comprising: a flexible non-metallic container and a relatively rigid metal support therefor, said metal support comprising two individual metal strips spaced apart and underlying the container bottom and freely separable therefrom, said two strips each having end portions secured to the ends of said container and forming a unitary construction, said two strips being bodily movable relative to each other whereby to provide a greater degree of flexibility to said container.

11. A freezing tray comprising: a flexible non-metallic container and a relatively rigid metal support therefor, said metal support being secured to said container only at two opposed end walls of said container whereby to form a unitary construction but still permit separation of said support and container at intermediate portions thereof.

12. A freezing tray comprising: a flexible non-metallic container and a relatively rigid metal support therefor, said metal support comprising two individual long narrow metal strips spaced apart and underlying and supporting the container bottom but freely separable therefrom, said strips each having end portions secured to the ends of said container, and a flexible handle member secured to the end portions of said two metal strips.

13. A freezing tray comprising: a flexible non-metallic container and a relatively rigid metal support therefor, said metal support having upturned end portions fixed to each of the end walls of said container at two laterally spaced points and having an intermediate portion underlying and supporting said container bottom but freely separable therefrom, and a handle member secured to said up-turned end portions of said metal support.

14. A freezing tray comprising: a flexible non-metallic container and a relatively rigid metal support therefor, said metal support comprising a relatively long narrow metal strip underlying and supporting the container bottom but freely separable therefrom, said strip having end portions secured only to the ends of said container and so forming a unitary construction, and a handle member secured to said metal support at one end of said container.

15. A freezing tray comprising: a flexible non-metallic container and a relatively rigid metal support therefor, said metal support being secured to said container only at two opposed end walls of said container whereby to form a unitary construction but still permit separation of said support and container at intermediate portions thereof, and a handle member secured to said metal support adjacent one of said end walls.

HARVEY D. GEYER.